United States Patent [19]
Davis

[11] Patent Number: 5,551,137
[45] Date of Patent: Sep. 3, 1996

[54] METHOD FOR ASSEMBLING WASTE MATERIALS FILTERING APPARATUS

[76] Inventor: Richard D. Davis, 4103 Redcoat Dr., Zephyrhills, Fla. 33543

[21] Appl. No.: 355,941

[22] Filed: Dec. 12, 1994

Related U.S. Application Data

[63] Continuation of Ser. No. 130,954, Oct. 4, 1993, abandoned.

[51] Int. Cl.$^6$ .............................. B23P 6/00; B01D 33/056
[52] U.S. Cl. .......................... 29/401.1; 29/434; 198/851; 210/160; 210/400; 210/401; 210/408; 210/526; 474/155
[58] Field of Search .................................... 198/851, 853; 474/153, 155; 29/401.1, 434; 210/160, 400, 401, 408, 526

[56] References Cited

U.S. PATENT DOCUMENTS

| 1,953,388 | 4/1934 | Bettin | 198/851 X |
| 2,549,729 | 4/1951 | Wallny | 210/401 |
| 3,246,734 | 4/1966 | Carvallo | 198/851 |
| 3,977,514 | 8/1976 | Kaess | 210/410 X |
| 4,597,864 | 7/1986 | Wiesemann | 210/400 X |
| 4,812,231 | 3/1989 | Wiesemann | 210/400 X |
| 4,950,398 | 8/1990 | Wiegand et al. | 210/526 X |

*Primary Examiner*—Joseph Gorski
*Attorney, Agent, or Firm*—Joseph C. Mason, Jr.; Ronald E. Smith

[57] ABSTRACT

A method for assembling an apparatus that removes solid waste material from a stream of water. The apparatus sits in a channel within which the water containing waste material flows. A plurality of vertically oriented, laterally spaced apart, rotating screens are driven by sprocket segments and provide a filtering function. The screens are formed by plural loops of articulated links. Each link includes a horizontally-extending part that lifts solid matter from the stream as the screens rotate. The assembly method includes placing the links on shafts in a predetermined pattern that creates a frusto-conical space bordered by links. The frusto-conical space provides ample clearance space for each sprocket segment and ensures that the sprocket segments will not rub against the links which in turn prevents the parts of the apparatus from becoming misaligned with respect to one another so that the apparatus may operate for extended periods of time without requiring adjustment.

4 Claims, 5 Drawing Sheets

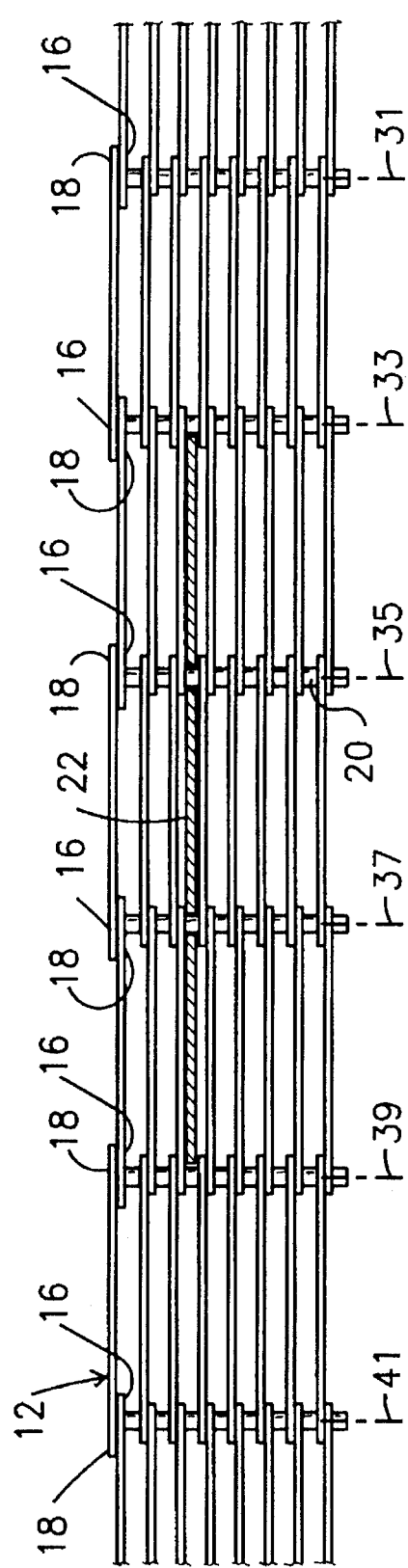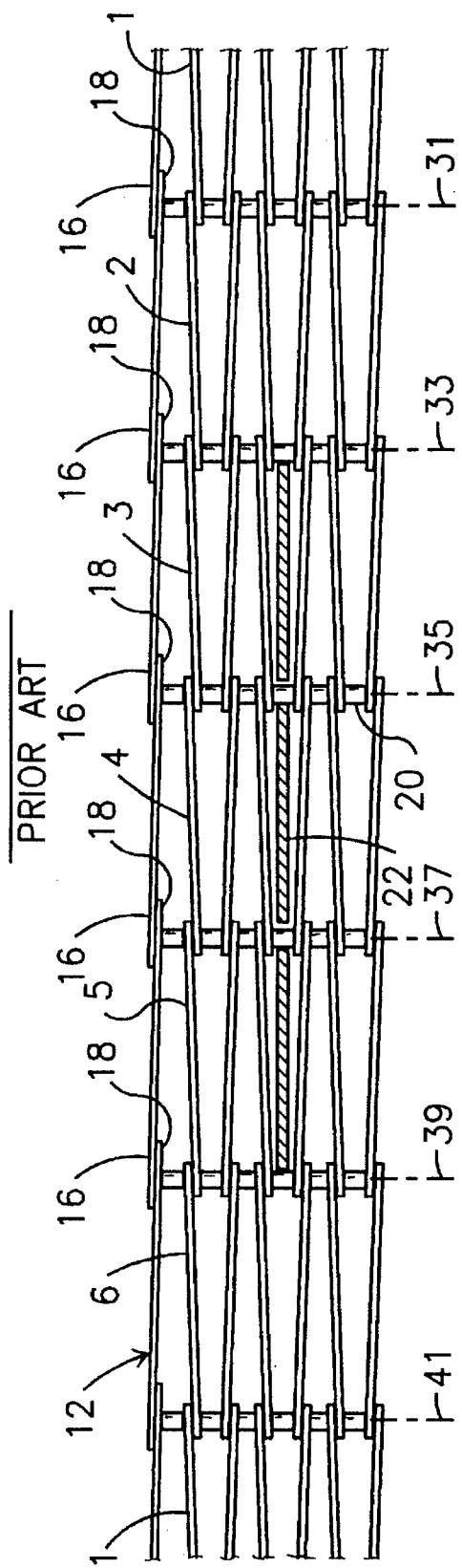

5,551,137

METHOD FOR ASSEMBLING WASTE MATERIALS FILTERING APPARATUS

This is a continuation of application(s) Ser. No. 08/130, 954 filed on Oct. 4, 1993, and now abandoned.

BACKGROUND OF THE INVENTION

1. Field of the Invention

This invention relates to improvements in methods for assembling machines. More particularly, it relates to a method for assembling the parts of a waste materials filtering apparatus in a way that substantially prevents misalignment and jamming of the apparatus.

2. Description of the Prior Art

U.S. Pat. No. 4,597,864 to Wiesemann discloses an apparatus for continuously removing relatively large items of waste materials from a water stream as a preliminary treatment of water at a municipal or industrial water or wastewater treatment facility. The apparatus sits in a channel within which flows a stream of water containing solid waste. It includes a rotating screen assembly having parts designed to lift solid matter from the stream of water as said stream flows through the apparatus.

The rotating screen assembly includes a plurality of vertically disposed, laterally spaced apart rotating screen segments that collectively form the screen, with the lateral spacing between contiguous rotating screen segments limiting the size of the waste materials that can flow past the machine and into downstream treatment stations where smaller particles are removed from the water. Each rotating screen segment is formed by a plurality of link members that are disposed in articulated relation to one another and which collectively form a loop of link members which revolve in a vertical plane. The trailing end of each link has an integral horizontally-extending part that lifts solid matter from the stream as the screen segments travel upwardly on the upstream side of the machine. Means are provided at the discharge end of the apparatus for dumping the matter so lifted into a solid waste collection container.

The screen assembly is rotated by a plurality of laterally spaced apart motor-driven sprocket segments positioned generally at the discharge end of the apparatus. The sprocket segments are positioned in offset relation to the individual links so that as the links pass thereover, the sprocket segments enter into the spaces between the links.

The apparatus performs its intended function, but it is subject to jamming because the apparatus performs well only when the sprocket segments are perfectly or almost perfectly aligned with respect to each contiguous set of links. Due to the large number of links, the alignment is not easily maintained. Even when the sprocket segments and links are in their respective ideal relative positions, the sprocket segments rub against their contiguous links in alternating succession, displacing each link about one-sixteenth of an inch per rub. More particularly, the links are displaced in a first direction in a first rub, and are displaced in an opposite direction during a second rub. Due to the rubbing and alternating displacement of the links, the sprocket segments and links eventually become misaligned and collide with one another. This bends the links, damages the sprocket segments, and prevents further rotation of the rotating screens until the apparatus has been disassembled and new links and sprocket segments installed. The repair procedure typically takes several days, during which time the municipality's water treatment system is incapacitated.

There has been a longstanding need for a new design that would prevent or at least substantially prevent the misalignment problem, but no solution has been apparent to those of ordinary skill the art.

SUMMARY OF THE INVENTION

The longstanding but heretofore unfulfilled need for an apparatus of the subject type that is not prone to jamming has now been fulfilled. Surprisingly, the solution to the jamming problem does not require complete re-designing of the apparatus; instead, it requires that certain parts of the apparatus be assembled in a different way. Thus, no municipality will lose its capital investment as would happen if the jamming problem were solved by a newly-designed apparatus. All that is required is that the screen segments of the existing devices be taken apart and re-assembled in accordance with the teachings of this invention. As re-assembled, they are not predisposed to jamming.

As will become more clear as this disclosure proceeds, the inventive method of assembly relates to the pattern formed by the links as they are re-assembled. In the earlier assembly procedure, each loop of links is assembled in the same pattern. From a logical point of view, the known assembly pattern is perfectly sensible and no one, before the present inventor, recognized that said assembly pattern was the culprit behind the misalignment problem. In the novel assembly procedure, the odd-numbered and even-numbered loops of links (screen segments) are assembled in a different pattern. The result is more clearance for the sprocket segments, an end to the rubbing, and an end to the misalignments caused by such rubbing.

It is thus understood that the primary object of this invention is to rectify the jamming problem associated with waste material filtering devices without redesigning the devices into which so much capital has been invested.

A closely related object is to rectify said problem in a way that merely requires partial disassembly of the existing device and reassembly in accordance with the teachings of this invention.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 4 is a detailed front elevational view of the link assembly of the prior art;

FIG. 5 is a detailed front elevational view of a first embodiment of the link assembly of this invention.

Similar reference numerals refer to similar parts throughout the several views of the drawings.

DETAILED DESCRIPTION OF THE PREFERRED EMBODIMENT

Figure 1:
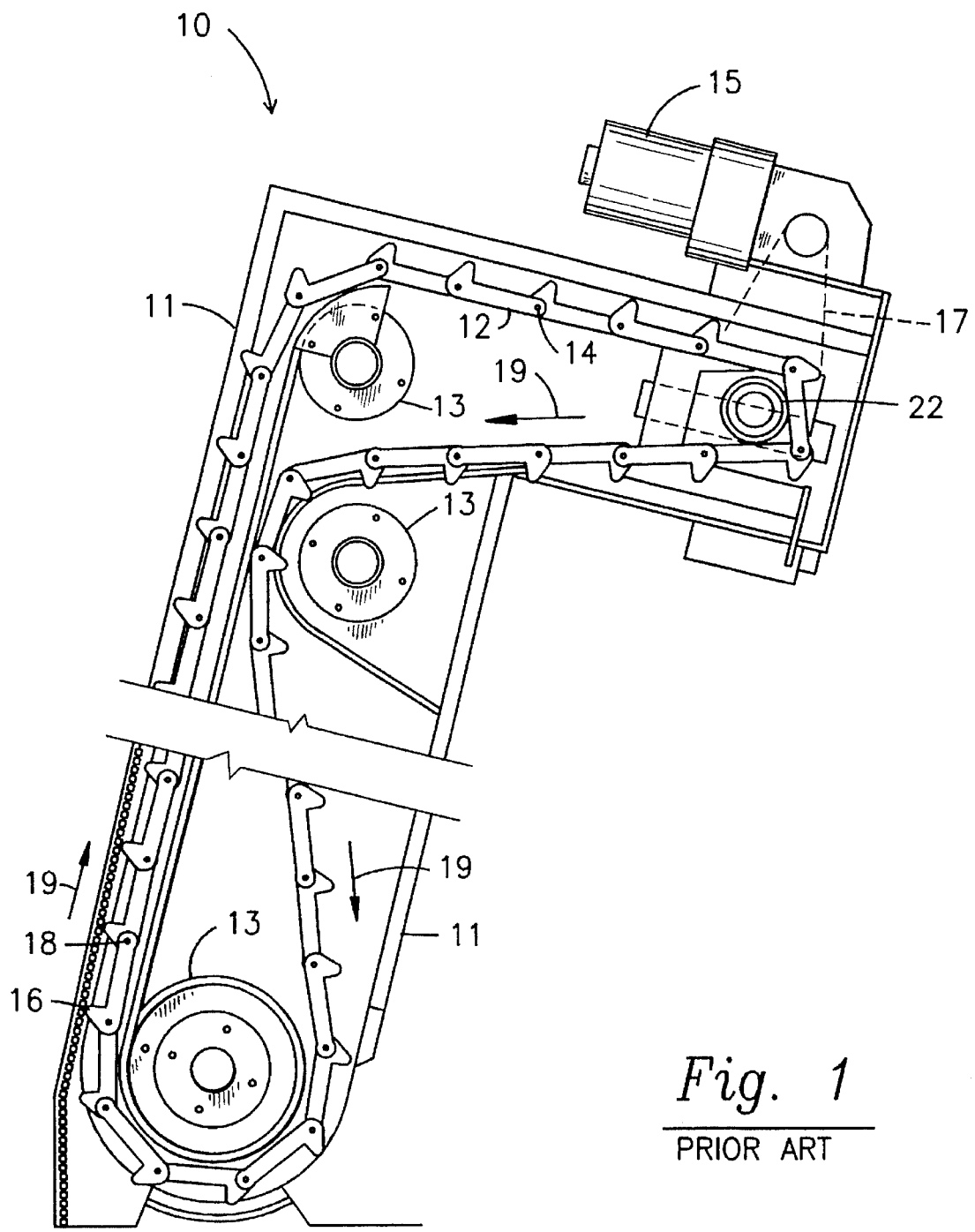
FIG. 1 is a side elevational view of the waste material filtering apparatus of this invention.

Referring first to FIG. 1, it will there be seen that a waste material filtering apparatus of the prior art is denoted 10 as a whole. Most of the parts thereof are not material to this invention and thus need not be described in detail herein; suffice it to say that the frame of the apparatus is denoted 11, a plurality of pipe spreaders are collectively denoted 13, a drive motor is denoted 15, and a drive belt 17 is shown in phantom lines.

Note that the opposite end of each link 12 is mounted on a shaft 14. The trailing end 16 of each link is the aforementioned horizontally-extending member that lifts solid matter from the water stream as the links rotate, as is perhaps best understood by observing the links at the lower left corner of FIG. 1. The uppermost or leading end of each link is denoted 18. Plural directional arrows, collectively denoted 19, show the path of travel followed by the links as the machine operates.

Figure 2:
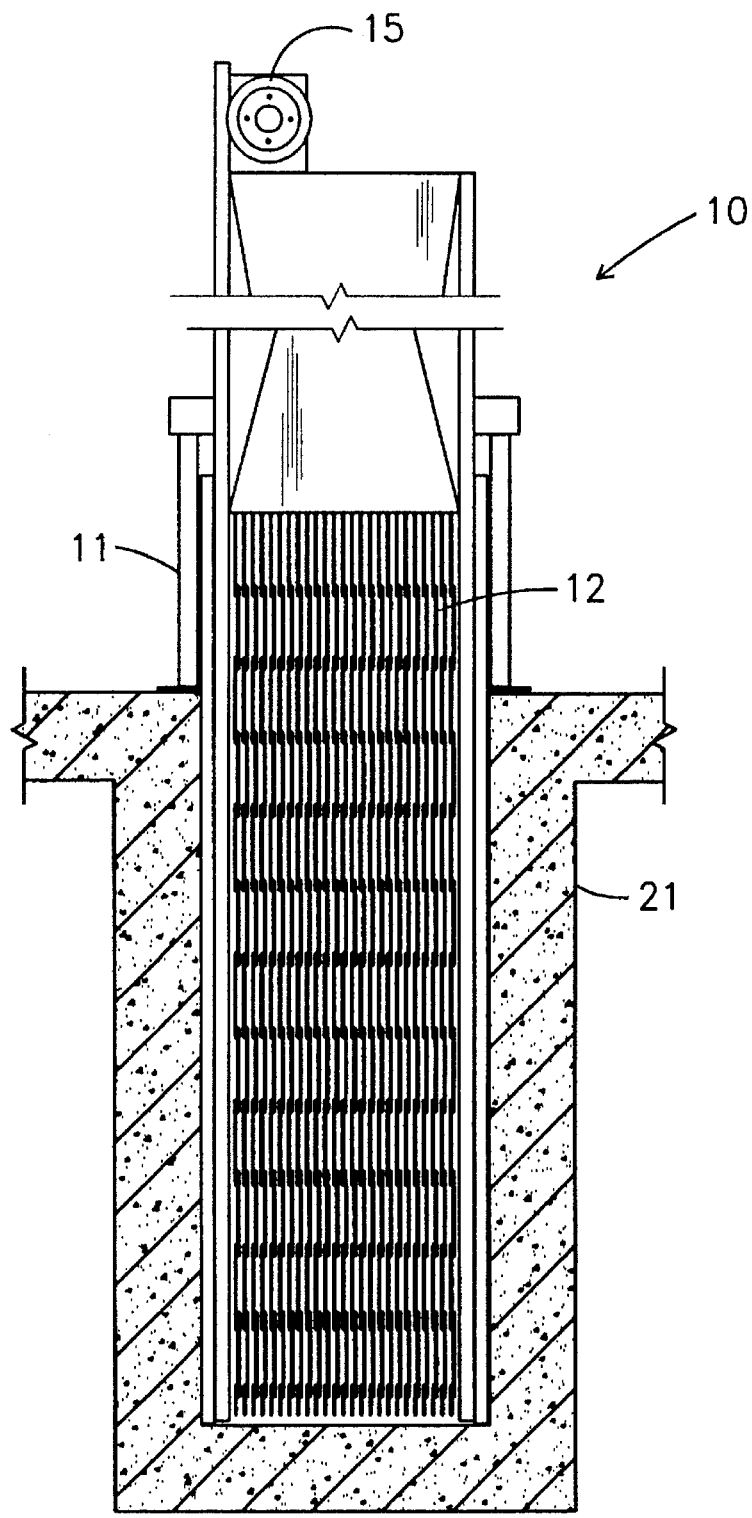
FIG. 2 is a front elevational view of said apparatus disposed in a channel for carrying waste water.

The orientation of machine 10 in a channel of water is shown in FIG. 2. The concrete channel is denoted 21. In this particular example, there are about twenty five upstanding screen segments disposed in equidistantly spaced lateral relation to one another, each screen segment being formed by a closed loop of articulated link members.

Figure 3:
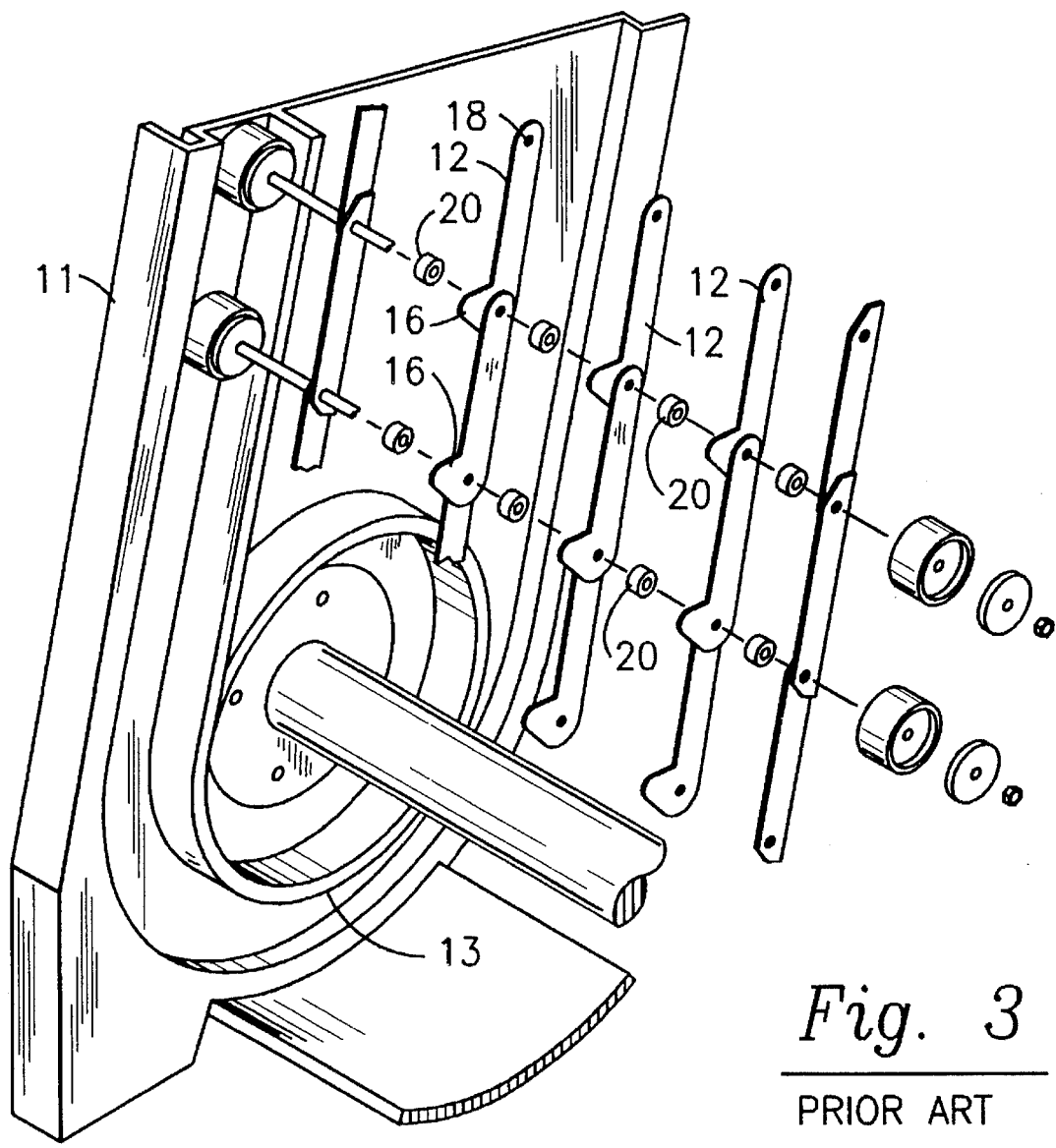
FIG. 3 is an exploded perspective view showing the assembly of the prior art.

Further details of construction of the prior art machine are shown in FIG. 3. The disclosure of the aforementioned Wiesemann patent is hereby incorporated into this disclosure by reference to provide additional details of construction concerning the apparatus which are not pertinent, per se, to this invention. FIG. 3 also discloses that each link 12 is flat and of straight configuration; this invention uses the same links.

The conventional assembly pattern of links is best understood in connection with FIG. 4. Although a typical apparatus will have a large number of shafts, for explanation purposes it should be understood that the shaft 41 at the left end of FIG. 4 is contiguous to the shaft 31 at the right end of said Figure, i.e., said shafts are formed in a loop as aforesaid. The links of the prior art rotating screen are assembled in the following pattern, beginning at the right side of FIG. 4 for convenience. The trailing and leading ends 16, 18, respectively, of a link 12 are slipped onto a pair of contiguous shafts 31, 33. The same procedure is repeated with a second link at shafts 35, 37, and so on until, as in this example, a last link is slid onto shafts 39 and 41. The trailing end of the next link is then slid onto shaft 31 and the leading end of that link is slid onto shaft 41. That pattern is then followed as links are placed on shafts 33, 35, and 37, 39 to complete the loop. Spacers 20 are then added to each shaft, and the same pattern of assembly is repeated to construct as many additional link loops (screen segments) as required for the application.

Thus, beginning with the initial row of links (i.e., at the top of FIG. 4), the pattern of links, making reference to shafts 31, 35, and 39, is leading, trailing, spacer, leading, trailing, spacer, and so on. With reference to shafts 33, 37, and 41, the pattern is trailing, leading, spacer, trailing, leading, spacer, and so on.

It is important to observe in FIG. 4 that this assembly pattern produces a plurality of generally rectangular areas bounded by the links.

Sprockets 22 are positioned between links 12 at predetermined locations as shown. Note that the sprocket 22 in the middle of the three depicted sprockets is rubbing against a link that underlies it in the view of FIG. 4, and that the links contiguous thereto are rubbing their respective overlying links. (The links do not actually overlie and underlie said sprockets; they are laterally disposed with respect to one another as aforesaid). The important observation is that the sprockets alternately rub links on their opposite sides as the screen rotates. This causes the individual links to alternately shift to the left and to the right (as viewed in FIG. 2) as they pass over the sprockets 22, and such rubbing eventually results in misalignment and damage to the links and to the sprockets, as mentioned above.

The novel assembly of parts is shown in a first embodiment in FIG. 5. The trailing and leading ends of each link 12 are again denoted 16, 18, respectively, and the spacers and sprockets are again denoted 20, 22, respectively. As in FIG. 4, the shafts 31, 41 at the opposite ends of the drawing are to be understood as being contiguous to one another, thereby indicating the looped construction of each screen segment. Beginning with the initial row of links (the top of FIG. 5), and moving away therefrom (toward the bottom of FIG. 5), the links are arranged on all shafts as follows: trailing, leading, spacer, leading, trailing, spacer, and so on. Unlike the prior art pattern of FIG. 4, the pattern is the same for each shaft. Also unlike the FIG. 4 pattern, the novel pattern repeats on the odd and even numbered rows of links.

Figure 6:
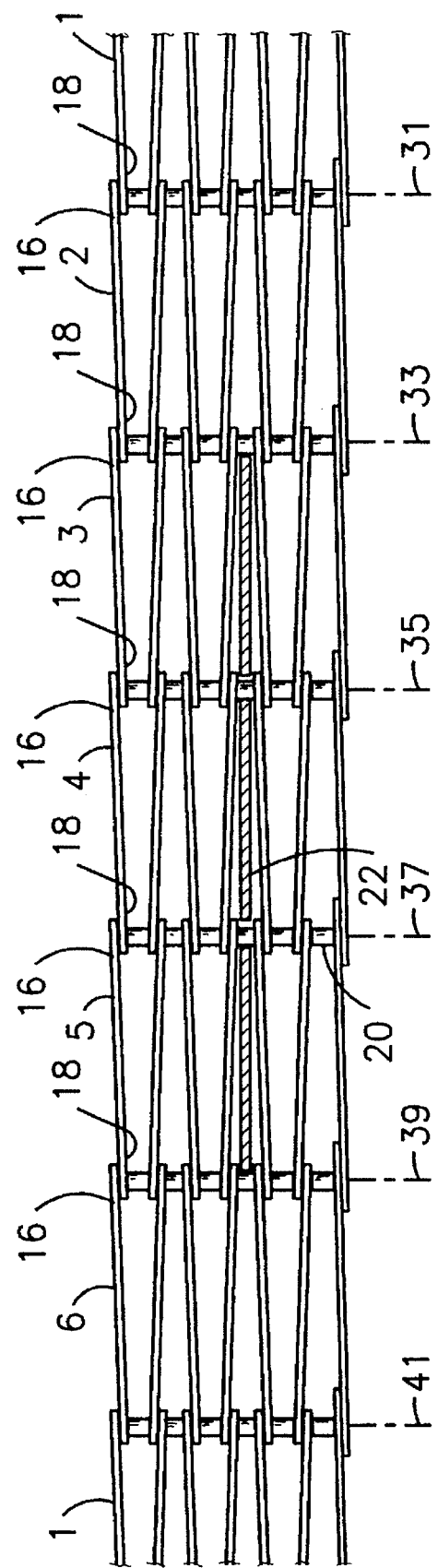
FIG. 6 is a detailed front elevational view of a second embodiment of the link assembly of this invention.

FIG. 6 depicts an alternative embodiment where the even-numbered rows of FIG. 5 are the odd-numbered rows of FIG. 6, and vice-versa. The pattern of links on each shaft for this embodiment, beginning at the top, is leading, trailing, spacer, trailing, leading, spacer, and repeat, i.e., the opposite pattern of the FIG. 5 embodiment.

Note how both assemblies create a frusto-conical space (when viewed in plan view as depicted) for occupancy by sprockets 20. As clearly depicted in FIGS. 5 and 6, the provision of said frusto-conical spaces provides ample clearance for each sprocket and therefore substantially eliminates all rubbing contact between the sprocket segments and the links, thereby substantially eliminating misalignments therebetween and the concomitant downtime for reassembly of the machine with new parts.

It should therefore be understood that the steps of the first embodiment of the novel method, as depicted in FIG. 5, include sliding the trailing end of a first link 1 onto a first shaft 31, sliding the leading end of a second link 2 onto said first shaft and simultaneously sliding the trailing end of said second link onto a second shaft 33, inserting a spacer 20 onto said first shaft, sliding the leading end of a third link 3 onto said second shaft 33 and simultaneously sliding the trailing end of said third link onto a third shaft 35, inserting a spacer onto said second shaft, repeating said steps for successive links and shafts, and completing a first loop of links by sliding the leading end of the first link (link 1) onto last shaft 41 after a trailing end of a last link 6 has been slid onto said last shaft, and by sliding a spacer onto said last shaft thereafter, forming a second loop of links by sliding the leading end of link 1 onto last shaft 41, sliding the trailing end of a last link 6 in said second loop onto said last shaft 41, simultaneously sliding a leading end of said last link 6 onto penultimate shaft 39 in said second loop, sliding a spacer onto said last shaft, sliding a trailing end of penultimate link 5 onto said penultimate shaft and simultaneously sliding the leading end of said penultimate link to third from last shaft 37, sliding a spacer onto said penultimate shaft 39, sliding a trailing end of a third from the last link 4 in said second loop onto said third from last shaft 37 and simultaneously sliding a leading end of said third from the last link 4 onto a fourth from the last shaft 35, sliding a spacer onto said third from the last shaft 37, repeating said steps for successive links and shafts, completing said second loop of links by sliding a trailing end of the first link 1 onto the first shaft 31 and by sliding a spacer onto said first shaft, and adding a predetermined number of loops of links by successively repeating the steps recited for the formation of said first and second loops of links until a desired number of loops of links has been assembled.

In the construction of FIG. 6, the novel method includes the steps of sliding the leading end of a first link 1 onto a last shaft 41, sliding the trailing end of a last link 6 onto said last shaft and simultaneously sliding the leading end of said last link onto a penultimate shaft 39, inserting a spacer onto said last shaft 41, sliding the trailing end of a second from last link 5 onto said penultimate shaft 39 and simultaneously sliding the leading end of said second from last link 5 onto a third from last shaft 37, inserting a spacer onto said penultimate shaft 39, repeating said steps for successive links and shafts, completing a first loop of links by sliding a trailing end of a first link 1 onto a first shaft 31 and sliding the leading end of said first link 1 onto said last shaft 41, and by sliding a spacer onto said first shaft thereafter, beginning a second loop of links by sliding the trailing end of a first link 1 in said second loop onto said first shaft 31, sliding a leading end of a second link 2 in said second loop onto said first shaft and simultaneously sliding a trailing end of said second link onto a second shaft 33, sliding a spacer onto said first shaft, sliding a leading end of a third link 3 in said second loop onto said second shaft 33 and simultaneously sliding a trailing end of said third link onto a third shaft 35, sliding a spacer onto said second shaft, repeating said steps for successive links and shafts, completing said second loop of links by sliding a leading end of said first link 1 onto said last shaft and by sliding a spacer onto said first shaft, and adding a predetermined number of loops of links by successively repeating the steps recited for the formation of said first and second loops of links until a desired number of loops of links has been assembled.

A simplified explanation of the two above-described alternatives will now be given. In the first embodiment, as shown in FIG. 5, the odd-numbered rows are constructed by sliding a trailing end of a first link onto a first shaft, thereafter sliding the leading end of a second link onto the first shaft and simultaneously sliding the trailing end of the second link onto a second shaft. The leading end of a third link is then slid onto the second shaft and the trailing end of the third link is simultaneously slid onto a fourth shaft. That pattern is repeated until the trailing end of the last link has been slid onto the last shaft (see the left end of the uppermost row in FIG. 5). The leading end of the first link is then slid onto the last shaft in overlying relation to the trailing end of the last link to complete the screen segment. Again, that pattern is followed for all odd-numbered rows to create the assembly depicted in FIG. 5.

The pattern for all the even-numbered rows in the FIG. 5 example is the reverse pattern; it starts at the left end of the Figure instead of the right end, and it begins by sliding the leading end of a first link onto the last shaft. The trailing end of a last link is then slid onto the last shaft and simultaneously the leading end of said last link is slid onto a penultimate shaft, and a spacer is slid onto the last shaft. The trailing end of a penultimate link is then slid onto the penultimate shaft and simultaneously the leading end of said penultimate link is slid onto a second from last shaft and a spacer is slid onto the penultimate shaft. This process is repeated until the first shaft 31 is reached; the trailing end of the first link is then slid onto said first shaft to complete the loop.

Thus, whether one begins with the pattern of the odd or even-numbered rows is entirely arbitrary. FIG. 5 may easily be understood as depicting both constructions, but for purposes of still further clarity, the alternate construction is shown in FIG. 6.

It should be understood that when the above-described assembly steps are followed, the assembly takes place near the outer end of each shaft, i.e., each row of links is not slid into its final position until each loop is completed.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for modifying a rotating screen assembly for a waste water filter apparatus disposed in a stream of waste water, said rotating screen assembly formed by a plurality of flat, parallel links and spacers mounted in a preselected pattern on a plurality of shafts disposed transversely with respect to a direction of flow of said waste water stream and where a predetermined distance between said parallel links determines the largest size of waste material that may flow through said waste water filter apparatus, said preselected pattern forming a substantially rectangular opening between adjacent parallel links with which is received a sprocket when the rotating screen is rotating, comprising the steps of:

disassembling said rotating screen assembly of said waste water filter apparatus by removing the links and spacers from each shaft of said plurality of shafts;

reassembling said rotating screen assembly by forming a first loop of links by sliding a trailing end of a first of said removed links onto a first shaft; then sliding a leading end of a second of said removed links onto said first shaft and simultaneously sliding a trailing end of said second link onto a second shaft; then inserting a spacer onto said first shaft;

sliding a leading end of a third of said removed links onto said second shaft and simultaneously sliding a trailing end of said third link onto a third shaft; then inserting a spacer onto said second shaft; then repeating said first loop forming steps for successive links, spacers and shafts; then completing said first loop of links by sliding a ending end of the first link onto a last shaft and then sliding a spacer onto said last shaft thereafter; then forming a second loop of links by sliding a leading end of a fourth of said removed links onto said last shaft; then sliding a trailing end of a fifth of said removed links onto said last shaft and simultaneously sliding a leading end of said fifth link onto a penultimate shaft; then sliding a spacer onto said last shaft; then sliding a trailing end of a sixth of said removed links onto said penultimate shaft and simultaneously sliding a leading end of said sixth link onto a third from the last shaft; then sliding a spacer onto said penultimate shaft;

repeating said second loop forming steps for successive links, spacers and shafts;

completing said second loop of links by sliding a trailing end of a last link onto said first shaft and then sliding a spacer onto said first shaft; and then adding a predetermined number of loops of links by successively repeating the steps recited for the formation of said first and second loops of links until a desired number of loops of links has been assembled, wherein along each shaft the following pattern is established; link trailing end, link leading end, spacer, link leading end, link trailing end, spacer;

said assembly of links creating a plurality of nonrectangular openings between adjacent nonparallel links within which are disposed sprockets that do not rub said links when the apparatus is in operation;

whereby said apparatus is less susceptible to jamming when reassembled because the nonrectangular openings provide increased clearance for said sprockets relative to the clearance provided by said preselected pattern.

2. A method for modifying a rotating screen assembly for a waste water filter apparatus disposed in a stream of waste water, said rotating screen assembly formed by a plurality of flat, parallel links and spacers mounted in a preselected pattern on a plurality of shafts disposed transversely with respect to a direction of flow of said waste water stream and where a predetermined distance between said parallel links determines the largest size of waste material that may flow through said waste filter apparatus, said preselected pattern forming a substantially rectangular opening between adjacent parallel links within which is received a sprocket when the rotating screen is rotating, comprising the steps of:

disassembling said rotating screen assembly of said waste water filter apparatus by removing the links and spacers from each shaft of said plurality of shafts;

reassembling said rotating screen assembly by forming a first loop of links by sliding a leading end of a first of said removed links onto a last shaft; then sliding a trailing end of a last of said removed links onto said last shaft and simultaneously sliding a leading end of said last link onto a penultimate shaft; then inserting a spacer onto said last shaft;

sliding a trailing end of a third of said removed links onto said penultimate shaft and simultaneously sliding a leading end of said third link onto a third from the last shaft; then inserting a spacer onto said penultimate shaft; then repeating said first loop forming steps for successive links, spacers and shafts; then completing said first loop of links by sliding a trailing end of the first link onto a first shaft, and then sliding a spacer onto said first shaft thereafter; then forming a second loop of links by sliding a trailing end of a fourth of said removed links onto said first shaft; then sliding a leading end of a fifth of said removed links onto said first shaft and simultaneously sliding a trailing end of said fifth link onto a second shaft; then sliding a spacer onto said first shaft; then sliding a leading end of a sixth of said removable links onto said second shaft and simultaneously sliding a trailing end of said sixth link onto a third shaft; then sliding a space onto said second shaft;

repeating said second loop forming steps for successive links, spacers and shafts;

completing said second loop of links by sliding a leading end of a first link onto said last shaft and then sliding a spacer onto said last shaft; and then adding a predetermined number of loops of links by successively repeating the steps recited for the formation of said first and second loops of links until a desired number of loops of links has been assembled, wherein along each shaft the following pattern is established; link trailing end, link leading end, spacer, link leading end, link trailing end, spacer;

said assembly of links creating a plurality of nonrectangular openings between adjacent nonparallel links within which are disposed sprockets that do not rub said links when the apparatus is in operation;

whereby said apparatus is less susceptible to jamming when reassembled because the nonrectangular openings provide increased clearance for said sprockets relative to the clearance provided by said preselected pattern.

3. A method for modifying a rotating screen assembly for a waste water filter apparatus disposed in a stream of waste water, said rotating screen assembly formed by a plurality of flat, parallel links and spacers mounted in a preselected pattern on a plurality of shafts disposed transversely with respect to a direction of flow of said waste water stream and where a predetermined distance between said parallel links determines the largest size of waste material that may flow through said waste water filter apparatus, said preselected pattern forming a substantially rectangular opening between adjacent parallel links within which is received a sprocket when the rotating screen is rotating, comprising the steps of:

disassembling said rotating screen assembly of said waste water filter apparatus by removing the links and spacers from each shaft of said plurality of shafts;

reassembling said rotatable screen assembly by slideably mounting said plurality of links and spacers onto said shafts in a predetermined pattern such that said predetermined pattern is repeated for each shaft;

said predetermined pattern being for each shaft a link trailing end, a link leading end, a spacer, a link leading end, a link trailing end, a spacer, and repeat patterns thereof;

whereby said apparatus is less susceptible to jamming when reassembled because nonrectangular openings formed by nonparallel adjacent links provide increased clearance for said sprockets relative to the clearance provided by said preselected pattern.

4. A method for modifying a rotating screen assembly for a waste water filter apparatus disposed in a stream of waste water, said rotating screen assembly formed by a plurality of flat, parallel links and spacers mounted in a preselected pattern on a plurality of shafts disposed transversely with respect to a direction of flow of said waste water stream and where a predetermined distance between said parallel links determines the largest size of waste material that may flow through said waste water filter apparatus, said preselected pattern forming a substantially rectangular opening between adjacent parallel links within which is received a sprocket when the rotating screen is rotating, comprising the steps of:

disassembling said rotating screen assembly of said waste water filter apparatus by removing the links and spacers from each shaft of said plurality of shafts;

reassembling said rotatable screen apparatus by slideably mounting said plurality of links and spacers onto said shafts in a predetermined pattern such that said predetermined pattern is repeated for each shaft;

said predetermined pattern being for each shaft a link leading end, a link trailing end, a spacer, a link trailing end, a link leading end, a spacer, and repeat patterns thereof;

whereby said apparatus is less susceptible to jamming when reassembled because nonrectangular openings formed by nonparallel adjacent links provide increased clearance for said sprockets relative to the clearance provided by said preselected pattern.

\* \* \* \* \*